US008378998B2

(12) United States Patent
Kim (10) Patent No.: US 8,378,998 B2
(45) Date of Patent: Feb. 19, 2013

(54) ELECTRONIC DEVICE, CONTROL METHOD THEREOF AND ELECTRONIC CONTROL SYSTEM INCLUDING THE SAME

(75) Inventor: Young-chan Kim, Uiwang-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 2020 days.

(21) Appl. No.: 11/392,744

(22) Filed: Mar. 30, 2006

(65) Prior Publication Data

US 2007/0002181 A1 Jan. 4, 2007

(30) Foreign Application Priority Data

Jun. 29, 2005 (KR) .................. 10-2005-0057152

(51) Int. Cl.
*G06F 3/038* (2006.01)
*G09G 5/00* (2006.01)

(52) U.S. Cl. ...................... 345/204; 345/690
(58) Field of Classification Search .......... 345/690, 345/156, 204; 725/141; 365/222
See application file for complete search history.

(56) References Cited

U.S. PATENT DOCUMENTS

| | | | | |
|---|---|---|---|---|
| 5,136,548 A | * | 8/1992 | Claar et al. ................. 367/2 |
| 5,978,863 A | * | 11/1999 | Gates et al. ................ 710/18 |
| 6,539,437 B1 | * | 3/2003 | Windheim et al. ......... 719/330 |
| 6,598,105 B1 | * | 7/2003 | Oshins et al. .............. 710/264 |
| 6,719,428 B2 | * | 4/2004 | Noguchi ..................... 353/31 |
| 7,269,843 B2 | * | 9/2007 | Yamaguchi et al. ........ 725/141 |
| 2002/0054016 A1 | * | 5/2002 | Smith et al. ................ 345/156 |
| 2002/0054032 A1 | * | 5/2002 | Aoki et al. .................. 345/204 |
| 2002/0087816 A1 | * | 7/2002 | Atkinson et al. ........... 711/156 |
| 2002/0122048 A1 | * | 9/2002 | Kanai ........................ 345/690 |
| 2002/0149541 A1 | * | 10/2002 | Shin ........................... 345/3.1 |
| 2003/0214604 A1 | * | 11/2003 | Lee ............................ 348/552 |
| 2004/0193784 A1 | * | 9/2004 | Kirsch ........................ 711/104 |
| 2005/0068835 A1 | * | 3/2005 | Matsuo ....................... 365/222 |
| 2005/0125829 A1 | * | 6/2005 | Ozaki ......................... 725/74 |
| 2005/0232306 A1 | * | 10/2005 | Lu .............................. 370/490 |

FOREIGN PATENT DOCUMENTS

| | | | |
|---|---|---|---|
| CN | 1869880 | | 11/2006 |
| CN | 1869880 A | * | 11/2006 |
| JP | 08-063444 | | 3/1996 |
| JP | 08063444 A | * | 3/1996 |
| JP | 09-271037 | | 10/1997 |
| JP | 2003-208266 | | 7/2003 |
| JP | 2003208266 A | * | 7/2003 |
| KR | 1997-0002584 | | 1/1997 |
| KR | 1020040006305 | | 1/2004 |

OTHER PUBLICATIONS

Office Action issued Apr. 4, 2008, from Chinese Patent Office.

* cited by examiner

*Primary Examiner* — Michael Pervan
(74) *Attorney, Agent, or Firm* — Stanzione & Kim, LLP (57) ABSTRACT

An electronic device which receives an external control signal from an external control device to perform a corresponding operation includes at least one control device to perform the corresponding operation according to the external control signal, a switching part to apply the external control signal to the control device selectively, and a control part to determine which of the at least one control device corresponds to a control target of the external control signal based on the external control signal, and to control an operation of the switching part to apply the external control signal to the determined control device that corresponds to the control target.

26 Claims, 6 Drawing Sheets

ELECTRONIC DEVICE, CONTROL METHOD THEREOF AND ELECTRONIC CONTROL SYSTEM INCLUDING THE SAME

CROSS-REFERENCE TO RELATED APPLICATIONS

This application claims priority from Korean Patent Application No. 2005-57152, filed on Jun. 29, 2005, in the Korean Intellectual Property Office, the disclosure of which is incorporated herein by reference in its entirety.

BACKGROUND OF THE INVENTION

1. Field of the Invention

The present general inventive concept relates to an electronic device, a control method thereof, and an electronic control system including the same, and more particularly, to an electronic device which performs an operation according to an external control signal, a control method thereof, and an electronic control system including the same.

2. Description of the Related Art

Figure 1:
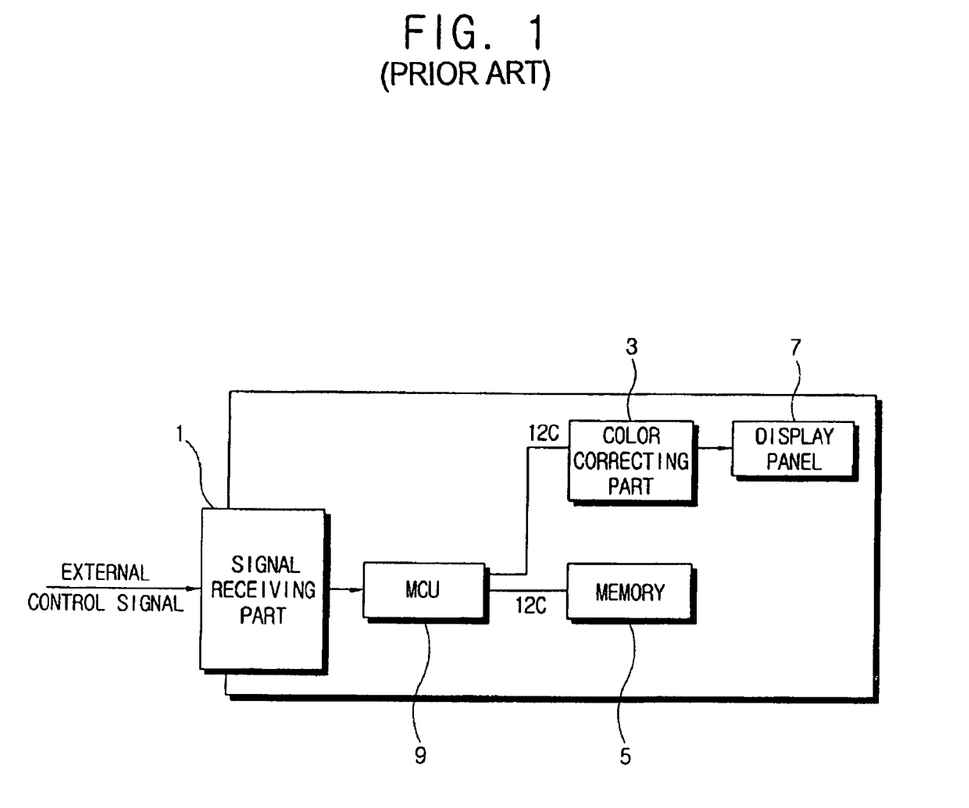
FIG. 1 is a control block diagram illustrating a conventional display device.

FIG. 1 illustrates a control block diagram of a conventional display device.

As illustrated in FIG. 1, in the conventional display device which performs an operation according to an external control signal, a micro controller unit (MCU) 9 receives the external control signal through a signal receiving part 1 to control a corresponding control device, which may include a color correcting part 3 and/or a memory 5.

For example, when a color correction is performed according to the external control signal, the external control signal is applied to the MCU 9, so that the MCU 9 controls the color correcting part 3 and the memory 5 to perform corresponding operations.

However, there are drawbacks that in that in order to access the control device (i.e., the color correcting part 3 and/or the memory 5) indirectly through the MCU 9, the MCU 9 should be separately provided with a program for controlling each of the control devices (i.e., the color correcting part 3 and/or the memory 5) using the external control signal, and since a time delay is required for the indirect access, it takes too much time to transfer data and a control command signal.

SUMMARY OF THE INVENTION

The present general inventive concept provides an electronic device in which a direct control of a control device by an external device is possible, a control method thereof, and an electronic control system including the same.

Additional aspects of the present general inventive concept will be set forth in part in the description which follows and, in part, will be obvious from the description, or may be learned by practice of the present general inventive concept.

The foregoing and/or other aspects of the present general inventive concept are achieved by providing an electronic device which receives an external control signal from an external control device to perform a corresponding operation, the electronic device comprising at least one control device to perform the corresponding operation according to the received external control signal, a switching part to apply the external control signal to the at least one control device selectively, and a control part to determine which of the at least one control device corresponds to a control target of the external control signal based on the external control signal, and to control an operation of the switching part to apply the external control signal to the determined control device that corresponds to the control target.

The control part may include a micro controller unit.

The control part may prevent the micro controller unit from accessing the determined control device while the external control signal is applied by the determined control device.

The control part may determine whether the micro controller unit is accessing the determined control device that corresponds to the control target, and if the micro controller unit is not accessing the determined control device, the control part may control the operation of the switching part to provide direct access of the determined control device to the external control device.

If the micro controller unit is accessing the determined control device, the control part may interrupt the access of the micro controller unit to the determined control device.

The electronic device may further comprise a display panel to display images, wherein the at least one control device includes one or more of a color correcting part to correct colors of the images displayed on the display panel and a memory to store color correction values therein.

The foregoing and/or other aspects of the present general inventive concept are also achieved by providing a display device, comprising a plurality of operating devices to perform a plurality of corresponding operations, a switching part to control access to the plurality of operating devices, and an internal control part to control operation of the switching part between a first operational state and a second operational state such that in the first operational state the switching part provides an external control device with direct access to the operating devices and in the second operational state the switching part does not provide the external control device with direct access to the operating devices.

The foregoing and/or other aspects of the present general inventive concept are also achieved by providing an electronic control system, comprising an external control device including an external control part to generate an external control signal having information about a control target, and a signal transmission part to transmit the external control signal, and an electronic device including a signal receiving part to receive the external control signal, at least one control device to perform a corresponding operation according to the external control signal, a switching part to selectively apply the external control signal to the at least one control device, and a control part to determine a control device from among the at least one control device based on the information about the control target included in the external control signal, and to control the switching part to apply the external control signal directly to the determined control device that corresponds to the control target.

If direct access of the external control device to the determined control device is completed, the external control part applies a switch off signal, and the control part controls the switching part to terminate the direct access to the determined control device when the switch off signal is received.

The control part may include a micro controller unit, and the control part may prevent the micro controller unit from accessing the determined control device while the external control device accesses the determined control device.

The control part may determine whether the micro controller unit is accessing the determined control device that corresponds to the control target, and if the micro controller unit is not accessing the determined control device, the control part may control the switching part to apply the external control signal to the determined control device, and if the micro controller unit is accessing the determined control device, the control part may interrupt the access to the determined control device by the micro controller unit and may control the switching part to apply the external control signal to the determined control device.

The electronic device further comprises a display panel to display images, and the at least one control device includes one or more of a color correcting part to correct colors of the images displayed on the display panel and a memory to store color correction values therein.

The foregoing and/or other aspects of the present general inventive concept are also achieved by providing a control method of an electronic device including at least one control device to perform a corresponding operation according to an external control signal received from a predetermined external control device, the method comprising extracting information about a control target from the external control signal when the external control signal is received, and selecting a control device based on the extracted information about the control target from among the at least one control device, and switching such that the external control signal is applied directly to the selected control device.

The electronic device may include a switching part which selectively applies the external control signal to the at least one control device, and the method may further comprise controlling the switching part such that a direct access of the external control device to the selected control device is cut off when a switching off signal is received from the external control device.

The electronic device may include a micro controller unit, and the method may further comprise preventing the micro controller unit from accessing the selected control device while the external control device is accessing the selected control device.

The control method may further comprise determining whether the micro controller unit is accessing the selected control device to be controlled, and controlling the switching part to apply the external control signal to the selected control device if the micro controller unit is not accessing the selected control device, and interrupting an access of the selected control device by the micro controller unit and controlling the switching part to apply the external control signal to the selected control device if the micro controller unit is accessing the selected control device.

The foregoing and/or other aspects of the present general inventive concept are also achieved by providing a method of controlling a display device having one or more operating devices to perform one or more corresponding operations, a micro control unit that accesses the one or more operating devices, and a switch to control access between an external control device and the one or more operating devices, the method comprising receiving an external control signal from the external control device, extracting information about a target operating device from the external control signal, and connecting the switch to the external control device with the target operating device.

BRIEF DESCRIPTION OF THE DRAWINGS

The above and/or other aspects of the prevent general inventive concept will become apparent and more readily appreciated from the following description of the exemplary embodiments, taken in conjunction with the accompany drawings, in which.

DETAILED DESCRIPTION OF THE PREFERRED EMBODIMENTS

Reference will now be made in detail to the embodiments of the present invention, examples of which are illustrated in the accompanying drawings, wherein like reference numerals refer to like elements throughout. The embodiments are described below so as to explain the present invention by referring to the figures. In the embodiment of the present invention, a display device is described exemplifying an electronic device, and a display system is described exemplifying an electronic control system.

Figure 2:
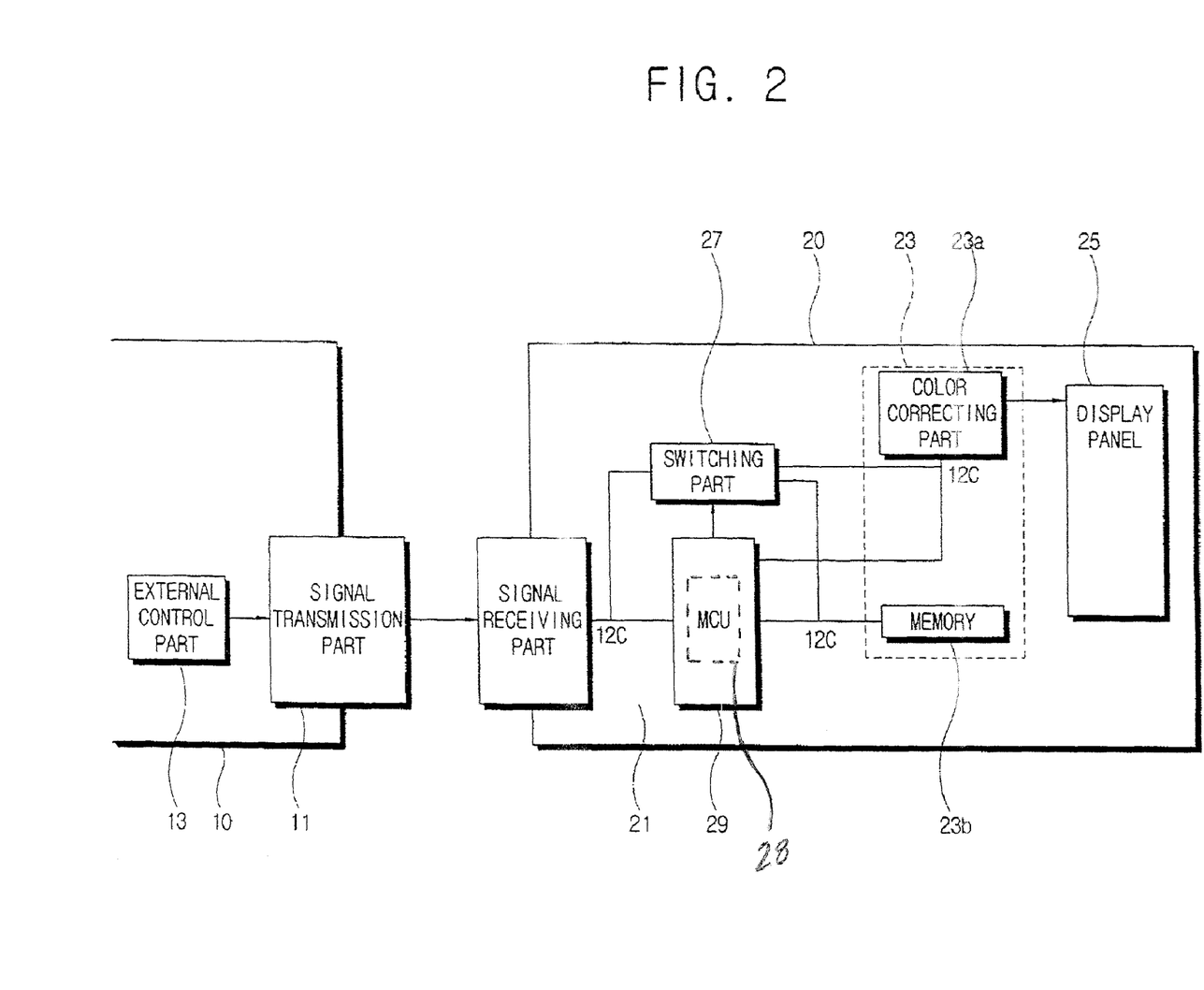
FIG. 2 illustrates a control block diagram of a display device in accordance with an embodiment of the present general inventive concept and a display system including the same.

FIG. 2 illustrates a control block diagram of a display device 20 in accordance with an embodiment of the present general inventive concept, and a display system including the same. As illustrated in FIG. 2, the display device 20 includes a signal receiving part 21, a control device 23, a display panel 25, a switching part 27, and a control part 29 that includes a micro control unit (MCU) 28.

An external control signal from an external source is input to the display device 20 through the signal receiving part 21.

The control device 23 refers to one or more (a plurality of) devices within the display device 20, which may perform a variety of functions, respectively. In other words, the control device 23 may include a plurality of operating devices that perform a plurality of corresponding operations and/or functions. In the present embodiment the control device 23 may be exemplified by a color correcting part 23a to correct a color reproduction of an image displayed on the display panel 25 and a memory 23b to store data. However, it should be understood that other components/devices may also be included in the control device 23 instead of or in addition to the color correcting part 23a and the memory 23b. The control device 23 is capable of I2C communication with an external control device 10 and the control part 29. Additionally, the external control device 10 may include more than one external control device with which the display device 20 can communicate.

The switching part 27 performs a switching operation to apply the external control signal directly to the corresponding control device 23 according to a control of the control part 29 (described below).

Figure 3:
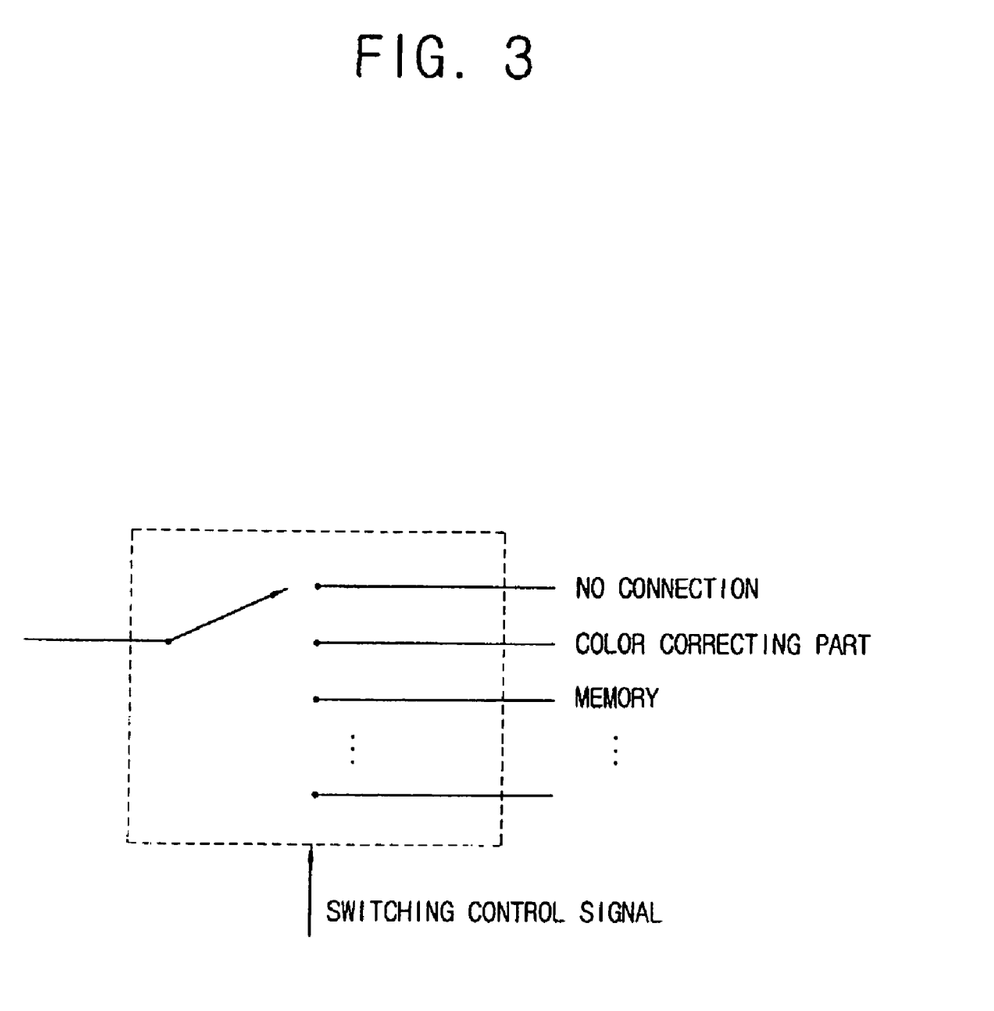
FIG. 3 illustrates a switching part of the display device of FIG. 2 in accordance with an embodiment of the present general inventive concept.

FIG. 3 illustrates the switching part 27 of the display device 20 of FIG. 2 in accordance with an embodiment of the present general inventive concept. As illustrated in FIG. 3, the switching part 27 performs the switching operation so as to make it possible for the external control signal input from the external control device 10 to access the corresponding control device 23 directly by selecting one connection to the control device 23 from among a no connection state in which there is no connection to the control device 23, a connection to the color correcting part 23a, a connection to the memory 23b, and a connection to another device/component included in the control device 23.

As illustrated in FIGS. 2 and 3, the control part 29 determines whether the external control signal input through the signal receiving part 21 is one which is for a direct access to the control device 23, and if it is a signal for the direct access, the control part 29 controls the operation of the switching part 27 such that the external control signal can be applied to the corresponding control device 23 (i.e., one of the color correcting part 23a, the memory 23b, or another device/component included in the control device 23) as a control target. The control part 29 may control operation of the switching part 27 according to executable code(s) of a software program or computer readable medium.

Herein, the external control signal input from the external control device 10 includes a control command signal for a direct access to the control device 23, or a release thereof. For example, the control command signal may be a switch connection signal to connect the switching part 27 to the control device 23 (i.e., switch on signal), the control target, a switch off signal, or the like. The control part 29 determines the corresponding control device 23 according to the control command signal and performs the control operation of the switching part 27, accordingly.

Therefore, the external control signal may be directly applied to the control device 23 as the control target, without passing through the control part 29, so that it is possible to access the control device 23 directly from the external control device 10.

Figure 4:
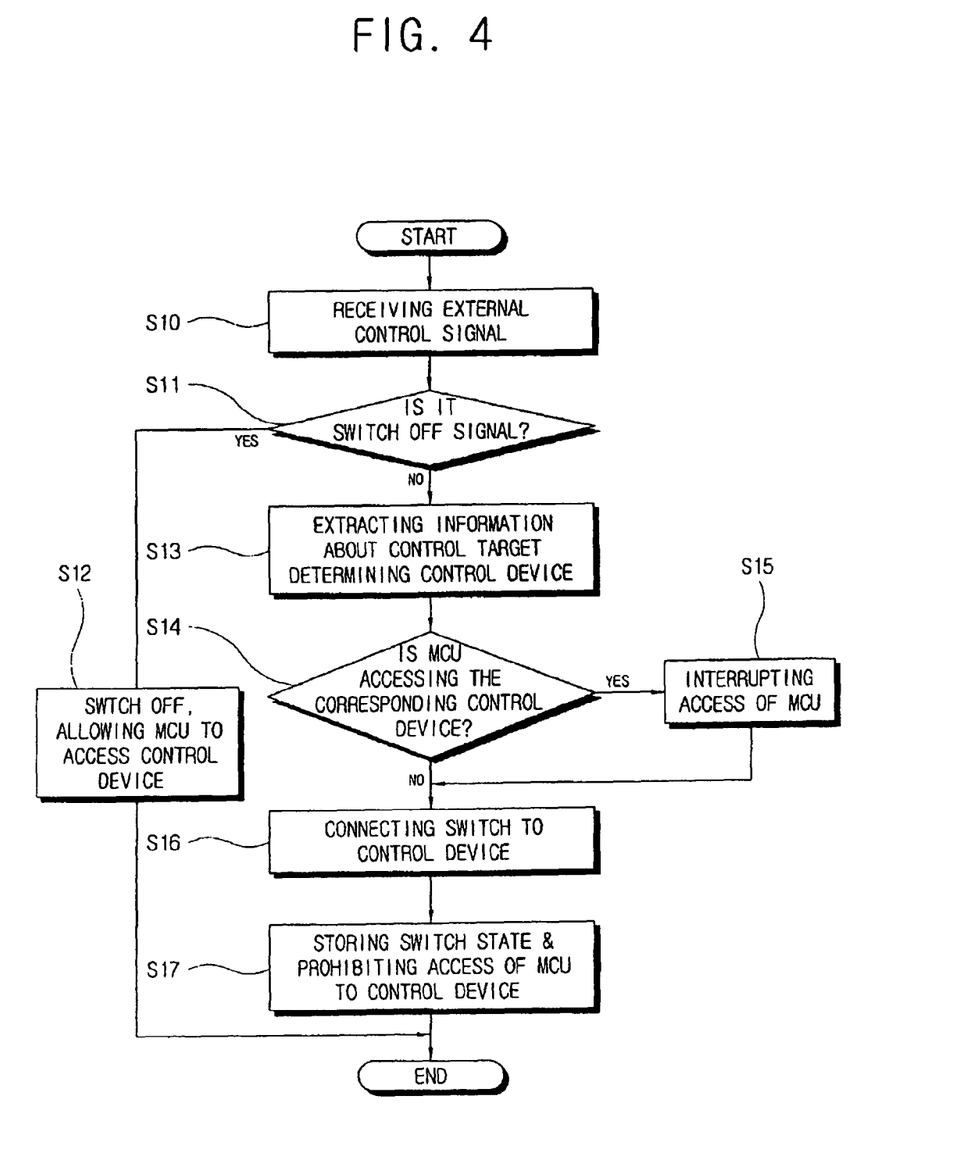
FIG. 4 is a control flow chart illustrating a method of controlling a display device in accordance with an embodiment of the present general inventive concept.

FIG. 4 illustrates a flow chart of a method of controlling a display device in accordance with an embodiment of the present general inventive concept. The control method may be performed to control the display device 20 of FIG. 2. Accordingly, the method of FIG. 4 is described below with reference to FIG. 2.

When the external control signal is input through the signal receiving part 21, the control part 29 determines whether the control command signal is one for direct access to the control device 23 at operation S10. If the control part 29 determines that the external control signal is the control command signal for the switch off at operation S11, the control part 29 controls the switching part 27 to operate in the no connection state, so that the MCU 28 can operate with direct access to the control device 23 at operation S12.

If the control part 29 determines that the external control signal is not the command control signal for the switch off, the control part 29 extracts information about the control target, and determines which of the control devices 23a, 23b, etc. (i.e., the corresponding control device 23) is the control target of the external control signal at operation S13. Although the embodiments of the present general inventive concept describe the control part 29 as controlling operations of the switching part 27 according to the external control signal, it should be understood that other types of control unit devices can also be used to control the switching part 27.

Then, it is determined whether the MCU 28 currently accessing the control target of the corresponding control device 23 at operation S14. The operation S14 determines whether the corresponding control device 23 is currently being operated (i.e., accessed) by the MCU 28 (or another control unit device) in order to prevent double access thereto. If the MCU 28 is currently accessing the corresponding control device 23, the access of the MCU 28 may be interrupted at operation S15. Alternatively, it is also possible to control the operation of the switching part 27 after informing the external control device 10 that the MCU 28 is currently accessing the corresponding control device 23, and waiting until the access to the corresponding control device 23 by the MCU 28 is completed.

If the corresponding control device 23 is not accessed by the MCU 28 or another control unit device, the control part 29 controls the switching part 27 such that the switch is connected to the corresponding control device 23 at operation S16, so that the external control signal received from the external control device 10 is directly applied to the corresponding control device 23.

The control part 29 stores a current state of the switching part 27 in a memory, and during the access of the external control signal to the corresponding control device 23, the access of the MCU 28 (or other control unit device) to the control device 23 is blocked at operation S17. This is also intended to prevent the double access.

Figure 5:
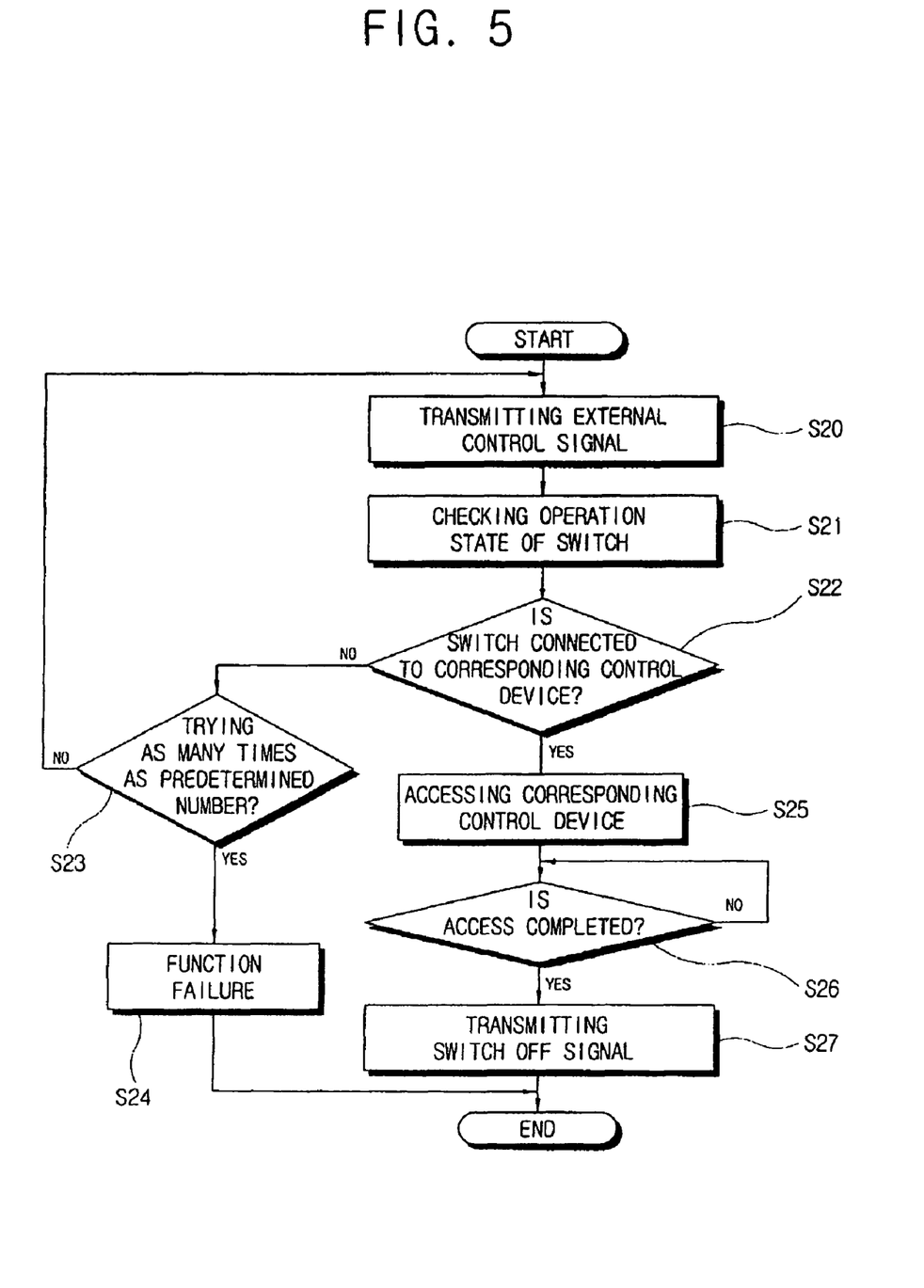
FIGS. 5 and 6 are control flow charts illustrating methods of controlling a display system in accordance with another embodiment of the present general inventive concept.
Figure 6:
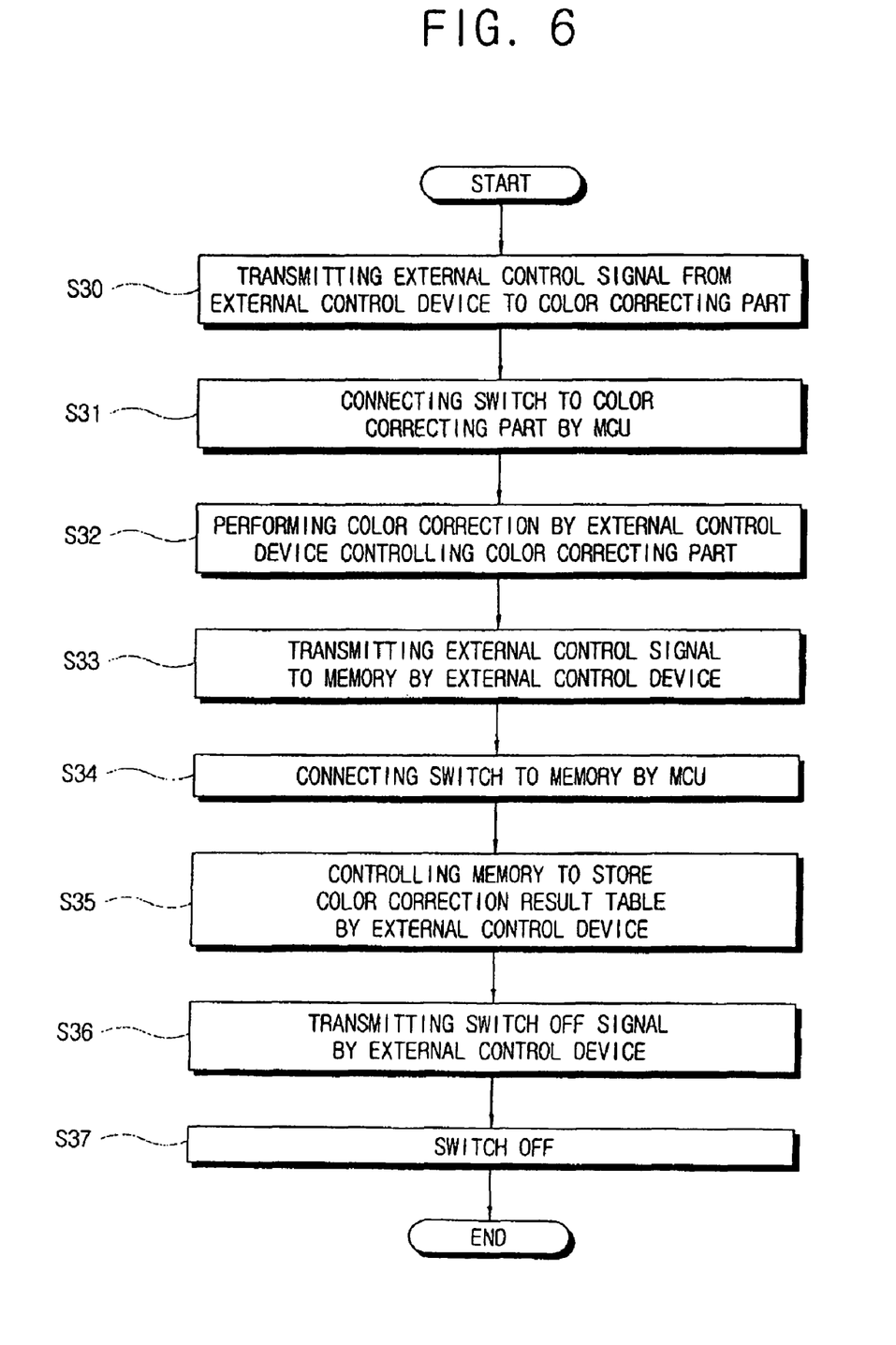

FIGS. 5 and 6 are control flow charts illustrating methods of controlling a display system in accordance with another embodiment of the present general inventive concept. The control methods of FIGS. 5 and 6 may be performed to control the display system of FIG. 2. Accordingly, the control methods of FIGS. 5 and 6 are described below with reference to FIG. 2.

As illustrated in FIG. 2, the display system includes the external control device 10 and the display device 20.

The external control device 10 has an external control part 13 which generates the external control signal to control the display device 20, and a signal transmission part 11 which transmits the generated external control signal to the display device 20. The external control device 10 can be realized by a computer or the like, and the signal transmission part 11 can include a D-Sub, a DVI connector, or the like. Also, the external control part 13 can be realized by an application program that communicates with the control part 29 of the display device 20. The display device 20 is described above with reference to FIGS. 2 and 3. Accordingly, a description thereof will not be provided below.

An operation of the external control part 13 in accordance with another embodiment of the present general inventive concept is described with reference to FIGS. 2 and 5.

The external control part 13 transmits the external control signal including a switch connection command (and/or the control command signal) which connects the switching part 27 (switch) to the control device 23 that corresponds to the control target, to the display device 20 through the signal transmission part 11 at operation S20.

Then, a current state of the switching part 27 is determined (checked) through the I2C communication with the control part 29 of the display device 20 at operation S21. That is, it is determined whether the switching part 27 (i.e., switch) is properly connected to the corresponding control device 23 according to the input external control signal at operation S22.

If the determination result is that the switching part 27 (switch) is not connected to the corresponding control device 23, a switch connection signal is transmitted repeatedly a predetermined number of times at operation S23 in an attempt to connect the switching part 27 (switch) to the corresponding control device 23. Further, in a case where the switching part 27 (switch) is determined not to be properly connected after trying the predetermined number times to connect to the corresponding control device 23, it is determined that a function failure has occurred at operation S24.

If the determination result is that the switching part 27 (switch) is connected to the corresponding control device 23, the external control part 13 directly accesses the corresponding control device 23 at operation S25. Also, the external control part 13 controls the control device 23 to perform a requested operation.

If the external control part 13 has completed the access to the corresponding control device 23 at operation S26 (e.g., if the corresponding control device 23 has completed a requested operation), the external control part 13 transmits the switch off signal to the display device 20 at operation S27 so that the switching part 27 is controlled to operate in the no connection state.

FIG. 6 illustrates a method of correcting color in a display system in accordance with another embodiment of the present general inventive concept. The method of FIG. 6 may be performed in the display system of FIG. 2. Accordingly, the method of FIG. 6 is described below with reference to FIG. 2.

The external control part 13 of the external control device 10 transmits the external control signal for a direct access control to the color correcting part 23a at operation S30. The control part 29 of the display device 20 then receives and analyzes the external control signal, determines which of the control device 23 (i.e., the memory 23b or the color correcting part 23a) is the control target, and controls the switching part 27 such that the switch is connected to the color correcting part 23a at operation S31.

Then, the external control part 13 determines whether the switching part 27 (switch) is connected to the color correcting part 23a, and if the determination result indicates that the switching part 27 (switch) is properly connected to the color correcting part 23a, the external control part 13 accesses the color correcting part 23a to perform a color correction at operation S32.

When the color correction is completed, the external control part 13 transmits the external control signal for directly accessing the memory 23b at operation S33. The control part 29 of the display device 20 then receives the external control signal, and controls the switching part 27 to connect the switch to the memory 23b at operation S34.

The external control part 13 then accesses the memory 23b to store a color correction table including results corrected by the color correcting part 23a at operation S35.

After the storing of the color correction table in the operation S35 is completed, the external control part 13 transmits the switch off signal to the display device 20 at operation S36, and the control part 29 of the display device 20 controls the switching part 27 to set the switch in the no connection state according to the received switch off signal at operation S37.

Therefore, it is possible to access the control device 23 of the display device 20 directly to perform a corresponding operation rapidly.

The embodiments of the general inventive concept can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. For example, the control part 29 (see FIG. 2) may be controlled by a computer readable medium.

As described above, in accordance with the various embodiments of the present general inventive concept, an electronic device in which a direct control of a control device can be achieved by an external device, a control method thereof, and an electronic control system including the same.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An electronic device which receives an external control signal from an external control device to perform a corresponding operation, the electronic device comprising:
   at least one control device to perform the corresponding operation according to the received external control signal;
   a switching part to transfer the external control signal to the at least one control device selectively; and
   a control part external from the switching part to receive the external control signal from the external control device and to determine which of the at least one control device corresponds to a control target of the external control signal based on the external control signal, and to control an operation of the switching part to transfer the external control signal to the determined control device that corresponds to the control target via direct access without passing the external control signal through the control part and if direct access of the external control device to the control device is provided and completed, the control part controls the switching part such that the direct access of the external control device to the control device is cut off.

2. The electronic device according to claim 1, wherein the control part comprises a micro controller unit.

3. The electronic device according to claim 2, wherein the control part prevents the micro controller unit from accessing the determined control device while the external control signal is applied to the determined control device.

4. The electronic device according to claim 3, wherein the control part determines whether the micro controller unit is accessing the determined control device that corresponds to the control target, and if the micro controller unit is not accessing the determined control device, the control part controls the operation of the switching part to provide direct access to the determined control device by the external control device.

5. The electronic device according to claim 4, wherein if the micro controller unit is accessing the determined control device, the control part interrupts the access of the micro controller unit to the determined control device.

6. The electronic device according to claim 5, further comprising:
   a display panel to display images, wherein the at least one control device includes one or more of a color correcting part to correct colors of the images displayed on the display panel and a memory to store color correction values therein.

7. The electronic device according to claim 1, further comprising:
   a display panel to display images, wherein the at least one control device includes one or more of a color correcting part to correct colors of the images displayed on the display panel and a memory to store color correction values therein.

8. A display device, comprising:
   a plurality of operating devices to perform a plurality of corresponding operations;
   a switching part to control access to the plurality of operating devices; and
   an internal control part to receive the external control signal and to control operation of the switching part between a first operational state and a second operational state such that in the first operational state the switching part provides an external control device with direct access to the operating devices and in the second operational state the switching part does not provide the external control device with direct access to the operating devices and if direct access of the external control device to the operating devices is provided and completed, the control part controls the switching part such that the direct access of the external control device to the operating devices is cut off.

9. The display device according to claim 8, wherein the plurality of operating devices perform a plurality of image processing operations.

10. The display device according to claim 9, wherein the plurality of operating devices comprise at least one of a color correcting part and a memory.

11. The display device according to claim 8, further comprising:
   a signal receiving part to receive a command control signal from the external control device to access a target operating device such that the internal control part controls the switching part between a no connection state and a plurality of connection states that correspond to the plurality of operating devices based on whether the command control signal is received and the target operating device.

12. The display device according to claim 8, wherein the switching part prevents double access to each of the operating devices by preventing access by the internal control part to a target operating device when the target operating device is being directly accessed by the external control device.

13. The display device according to claim 8, wherein the switching part prevents double access to each of the operating devices by interrupting access to a target operating device by the internal control part, when the internal control part receives a command control signal from the external control device requesting access to the target operating device.

14. The display device according to claim 8, wherein the internal control part prevents double access to each of the operating devices by notifying the external control device that a target operating device is being accessed, when the internal control part receives a command control signal from the external control device requesting access to the target operating device and the internal control part is accessing the target operating device.

15. An electronic control system, comprising:
   an external control device including an external control part to generate an external control signal having information about a control target including a control command signal to connect to a switching part, and a signal transmission part to transmit the external control signal; and
   an electronic display device including a signal receiving part to receive the external control signal, at least one control device to perform a corresponding operation according to the external control signal, a switching part to selectively send the external control signal to the at least one control device, and a control part to receive the external control signal and to determine the control device to perform the operation from among the at least one control device based on the information about the control target included in the external control signal, and to control the switching part using the control command signal to send the external control signal directly to the determined control device that corresponds to the control target without the external control signal passing through the control part,
   wherein if direct access of the external control device to the determined control device is completed, the external control part applies a switch off signal, and the control part controls the switching part to terminate the direct access to the determined control device when the switch off signal is received.

16. The electronic control system according to claim 15, wherein the control part comprises a micro controller unit, and the control part prevents the micro controller unit from accessing the determined control device while the external control device is accessing the determined control device.

17. The electronic control system according to claim 16, wherein the control part determines whether the micro controller unit is accessing the determined control device that corresponds to the control target, and if the micro controller unit is not accessing the determined control device, the control part controls the switching part to apply the external control signal to the determined control device, and if the micro controller unit is accessing the determined control device, the control part interrupts the access of the determined control device by the micro controller unit and controls the switching part to apply the external control signal to the determined control device.

18. The electronic control system according to claim 17, wherein the electronic device further comprises:
   a display panel to display images, and the at least one control device includes one or more of a color correcting part to correct colors of the images displayed on the display panel and a memory to store color correction values therein.

19. The electronic control system according to claim 15, wherein the electronic device further comprises:
   a display panel to display images, and the at least one control device includes one or more of a color correcting part to correct colors of the images displayed on the display panel and a memory to store color correction values therein.

20. A control method of an electronic device including at least one control device to perform a corresponding operation according to a control command signal included in an external control signal received at a control part from a predetermined external control device, the method comprising:
   extracting information including information for direct access about a control target from the control command signal when the external control signal is received at the control part;
   selecting a control device based on the extracted information about the control target from among the at least one control device, and switching the external control signal through a switching part in the electronic device external from the control part such that the external control signal is applied directly to the selected control device; and
   controlling the switching part such that the direct access of the external control device to the selected control device is cut off if direct access of the external control device to the control device is completed.

21. The control method according to claim 20, wherein the switching part selectively applies the external control signal to the selected control device, and the method further comprises:
   controlling the switching part such that the direct access of the external control device to the selected control device is cut off when a switching off signal is received from the external control device.

22. The control method according to claim 21, wherein the electronic device comprises a micro controller unit, and the method further comprises:

preventing the micro controller unit from accessing the selected control device while the external control device is accessing the determined control device.

23. The control method according to claim 22, further comprising:
   determining whether the micro controller unit is accessing the selected control device to be controlled; and
   controlling the switching part to apply the external control signal to the selected control device if the micro controller unit is not accessing the selected control device, and interrupting an access of the selected control device by the micro controller unit and controlling the switching part to apply the external control signal to the selected control device if the micro controller unit is accessing the selected control device.

24. A method of controlling a display device having one or more operating devices to perform one or more corresponding operations, a control part including a micro control unit that accesses the one or more operating devices, and a switch external to the control part to control access between an external control device and the one or more operating devices, the method comprising:
   receiving an external control signal in the control part from the external control device;
   extracting information about a target operating device from the external control signal; and
   connecting the switch to the external control device with the target operating device such that the external control signal received from the external control device is given direct access to the target device and if direct access of the external control device to the target operating device is completed, the control part controls the switch such that the direct access of the external control device to the target operating device is cut off.

25. The method according to claim 24, further comprising:
   storing the state of the switch such that the external control device can determine the state of the switch.

26. A display device comprising:
   a control part to receive an external control signal from an external control part and to determine whether the external control signal is for direct access to a control device; and
   a switching part to perform a switching operation to send the external control signal to the control device according to a determination of the control part and to switch the external control signal to the control device without passing through the control part and if direct access of the external control part to the control device is completed, the control part controls the switching part such that the direct access of the external control device to the control device is cut off.

* * * * *